April 27, 1965  R. F. McGIVERN ETAL  3,181,099
LIQUID RHEOSTAT
Filed July 25, 1962  2 Sheets-Sheet 2
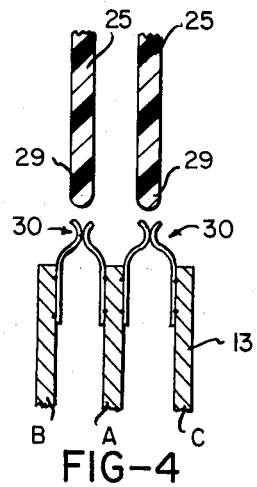
FIG-4
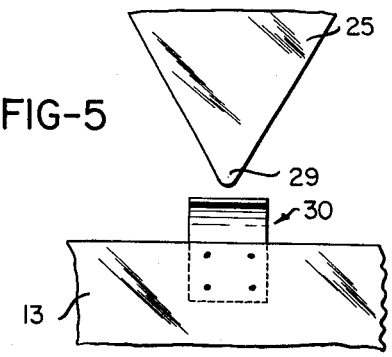
FIG-5
FIG-6
FIG-7
INVENTORS
ROBERT F. McGIVERN &
LEONARD J. UCKER
BY MAHONEY, MILLER & RAMBO
Wm. V. Miller
ATTORNEYS

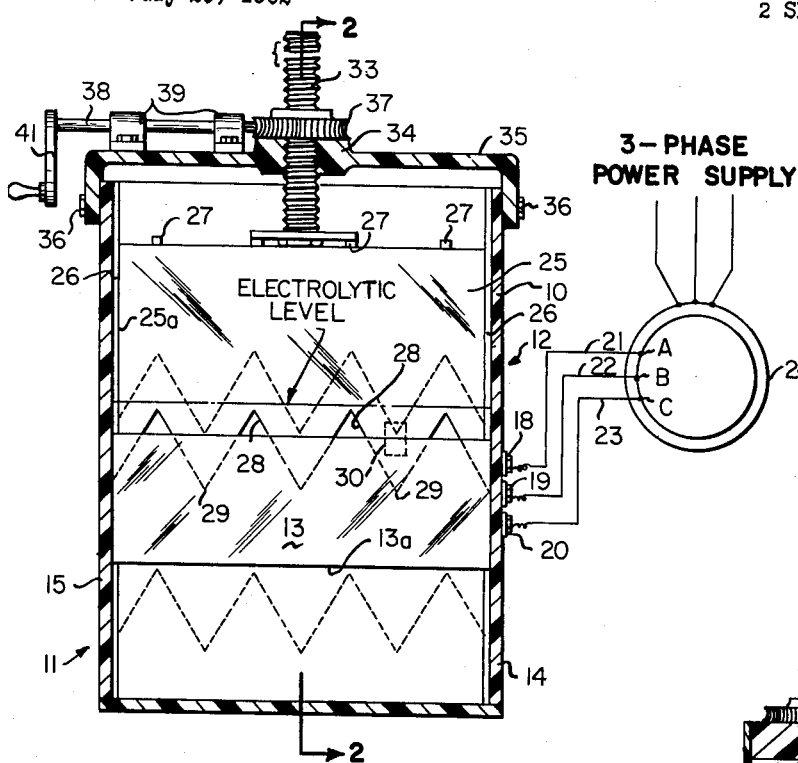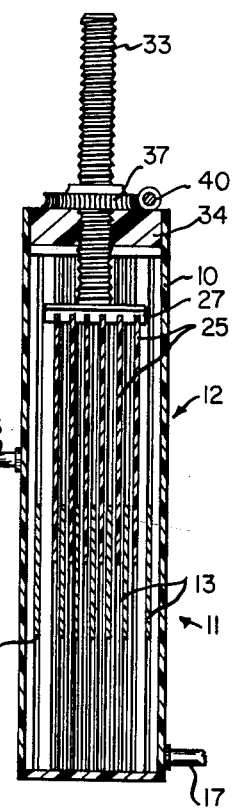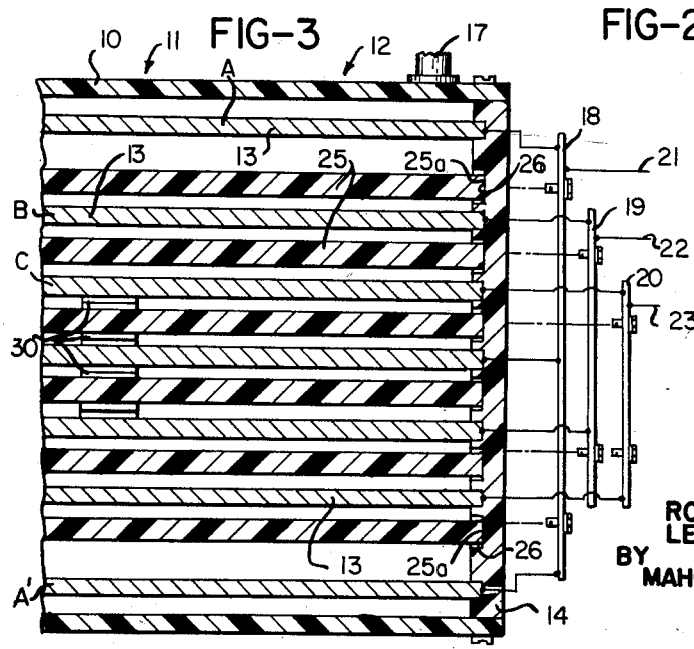

United States Patent Office 3,181,099
Patented Apr. 27, 1965

3,181,099
LIQUID RHEOSTAT
Robert F. McGivern, 64 Plesenton Drive, Worthington, Ohio, and Leonard J. Ucker, 110 E.N. Broadway, Columbus, Ohio
Filed July 25, 1962, Ser. No. 212,428
4 Claims. (Cl. 338—82)

This invention relates in general to a liquid rheostat of the parallel plate type. It relates, more specifically to a liquid rheostat having a plurality of relatively spaced electrode plates immersed in a conducting media and a plurality of insulating members which may be moved relative to the electrodes for varying the resistance between any two electrodes.

Liquid rheostats are widely utilized in electrical systems for the speed control of electric motors. As a specific example, a fluid pumping apparatus including a variable volume pump which is controlled by speed change is often driven by an electric motor which may be readily controlled as to speed. A liquid rheostat of the prior art type generally consists of a plurality of parallel electrically conducting plates or electrodes which are relatively spaced and electrically connected to a rotor of the motor which the rheostat is to control. Varying the resistance between any two adjacent electrodes will produce a proportional change in the speed of the motor. The resistance between any two plates is a function of the specific resistivity of the conducting media between the two plates, the spacing therebetween and the opposed surface area of the plates. In the most common type of liquid rheostat, the electrodes are mounted as a fixed assembly which is movable relative to an electrically conducting media to effect a change in the opposed surface area and thereby control the resistance. As the electrodes are immersed in the conducting media, which may be any of the well known electrolytic solutions, the resistance between any two electrodes will vary proportionally. The specific resistivity of the usual electrolytic solution is considerably less than that of the atmosphere above the surface of the electrolytic solution. By appropriate spacing of the electrodes, no conduction will occur in the air. Thus, as the plates or electrodes are immersed in the electrolytic solution, the area of the plates immersed will be varied. The resistance between any two plates is inversely proportional to the area of the plates and the resistance therefore decreases as the electrodes are immersed.

The variation in the area of immersion has been accomplished heretofore by two alternative methods. For one method, the electrodes are mounted for movement relative to the conducting media or electrolytic solution and are carried on a controllable supporting apparatus. In the other method, the electrodes are maintained in a fixed position and the level of the electrolytic solution is caused to vary. A disadvantage of either method results from the fact that portions of electrodes are alternately exposed to the atmosphere and immersed in the electrolytic solution. The electrodes must be fabricated from a metal possessing the necessary properties of electrical conductivity which will generally corrode when subjected to a relatively moist atmosphere. This is particularly true at that point on electrodes coinciding with the interface of the electrolyic solution and the atmosphere. Corrosion of the plates results in inferior performance after prolonged intervals of use eventually requiring replacement of the electrodes. Another major disadvantage of the relatively movable electrodes and electrolytic solution is the inherent lack of precise resistance control at the point where the electrodes are entering or leaving the electrolytic solution. Assuming that the lower edge of the electrodes are lines parallel to the surface of the electrolytic solution, a sharply defined change will be observed in the total resistance when the electrodes are not in contact with the electrolytic solution and after the lower edge thereof is in contact with the electrolytic solution. In the former position, the resistance will approach infinity whereas, in the latter position, the resistance between any two plates will be a finite measurable quantity. This feature is undesirable in that there will be a correspondingly large change in speed of the motor controlled thereby as the electrodes are initially lowered into the solution. The effect produced in a polyphase electric motor of the wound rotor induction type is that the speed will be quickly increased or decreased for a small relative movement of the electrodes but relatively large change in resistance. This disadvantage has been partially alleviated in liquid rheostats of the prior art type by forming V-shaped notches in the lower marginal edge of each electrode plate. With this type of electrode plate, the change in resistance associated with the initial contact between the electrodes and the electrolytic solution will be substantially reduced. A more precise control of the motor speed is thus obtained by this type of electrode. There is, however, an accompanying disadvantage in forming notches at the lower edge of the electrodes. At the point of initial contact, the electrical current will be concentrated in a relatively small area. This increase in current density will tend to erode metal electrodes in the vicinity of the points of the notches. After prolonged periods of operation, under conditions where erosion may occur, the plates will deteriorate to such an extent that they will become unserviceable and require replacement. Another disadvantage of high current density is that it produces localized heating of the electrolytic solution. Heating of the electrolytic solution changes its specific resistivity to decrease the resistance between two adjacent plates. Any change in resistance necessarily requires that the electrodes be moved relative to the electrolytic solution to maintain a constant resistance.

Liquid rheostats of the prior art type are generally constructed with a plurality of spaced parallel electrode plates. For polyphase electrical systems, the number of plates is generally some multiple of the number of phases and one additional electrode plate with the two outer electrodes connected to the same phase to at least partially eliminate the unbalanced resistance condition which is characteristic of prior art parallel plate polyphase liquid rheostats. This method of correction is only partly effective as the addition of an electrode introduces a change in the conductive area of the electrode connected to that phase.

It is, therefore, the primary object of this invention to provide a liquid rheostat having fixed, relatively spaced electrodes which remain immersed in the electrolytic solution and the effective area of the electrodes is varied to change the resistance.

It is another object of this invention to provide a liquid rheostat having a parallel plate type electrode assembly disposed in an electrolytic solution and an insulator assembly movable relative to the electrodes for varying the conductivity between each pair of electrodes.

It is a further object of this invention to provide a liquid rheostat having a plurality of electrode plates which remain immersed in an electrolytic solution and the resistance therebetween is varied by the insertion of an electrically insulating plate between each pair of electrodes.

It is also an object of this invention to provide a liquid rheostat having a plurality of relatively spaced electrode plates for a polyphase electrical system in which the electrodes are sequentially phase-connected with the outer two electrodes connected to the same phase and spaced a distance from the respective adjacent plates to provide a uniform resistance between the electrodes connected to any two phases.

These and other objects and advantages of this invention will be readily apparent from the following detailed description thereof and the accompanying drawings.

In the drawings:

FIGURE 1 is a vertical sectional elevation of an embodiment of the liquid rheostat with the electrodes thereof connected to a schematic electrical circuit;

FIGURE 2 is a vertical sectional view taken along line 2—2 of FIGURE 1;

FIGURE 3 is a fragmentary horizontal sectional view of the electrode assembly;

FIGURE 4 is an enlarged sectional detail of the electrodes provided with shorting contacts;

FIGURE 5 is an enlarged side elevation of a shorting contact;

FIGURE 6 is a perspective view of a modified form of the liquid rheostat; and

FIGURE 7 is a vertical sectional elevation of the modified liquid rheostat.

Referring to the drawings, the liquid rheostat comprises in general a receptacle 10, an electrode assembly 11, and a movable insulator assembly 12. The receptacle 10 is of a generally rectangular shape with an open top and spaced parallel, vertically extending end walls 14 and 15. In the illustrated embodiments, the walls of the receptacle 10 are fabricated from an electrically insulating material. Disposed within the receptacle 10 in fixed relationship thereto is the electrode assembly 11. The electrode assembly 11 includes a plurality of electrode plates 13 which are relatively spaced. Each of the electrode plates 13 comprises a flat rectangularly shaped plate fabricated from an electrically conducting material. The plates 13 are disposed in vertical planes and extend between opposed end walls 14 and 15 of the receptacle 10. Preferably, each end wall 14 and 15 has a plurality of spaced, vertically extending slots formed on the inner surface thereof for receiving the electrode plates 13. The ends of the electrode plates 13 are rigidly fixed in the slots formed in the end walls 14 and 15 and are, therefore, electrically insulated. The electrode plates 13 are vertically positioned within the receptacle 10 with the lower marginal edges 13a thereof spaced a given distance from the bottom of the receptacle. The receptacle 10 is filled with a sufficient quantity of electrolytic solution to fully immerse the electrode plates 13. A cooling system (not shown) is connected to the receptacle by the inlet and outlet conduits 16 and 17 for maintaining the electrolytic solution at a substantially constant temperature.

In the illustrated embodiment, the electrode assembly 11 includes seven parallel spaced electrodes 13 which are connected for operation with a three-phase electrical system having phases A, B, and C. Each electrode plate 13 is connected to a bus bar 18, 19, or 20 by a lead extending through a fluid-impervious seal in the end wall 14 of the receptacle 10. The electrodes 13 are sequentially connected to the respective bus bars 18, 19, and 20 substantially as indicated in FIGURE 3 with the two outer or end electrode plates connected to the same bus bar which is 18 in this instance. It is to be understood, however, that the number of electrodes required for an electrode assembly is not limited to seven. The number may be increased or decreased in accordance with the electrical specifications of the particular application provided that the total number of plates is equal to the number of phases, or some multiple thereof, and one additional plate.

The purpose in including an additional plate is to obtain a balanced resistance among the phases of a polyphase electric system. A three-phase system will be considered for illustrative purposes although this discussion is equally applicable to other polyphase systems. In a three-phase system having three spaced parallel electrodes with each electrode being connected to one of the phases A, B or C, three electrically conductive paths will be formed. Assuming that the outer two electrodes are connected to phases A and C, respectively, the electrically conducting paths will be between electrodes A–B, B–C, and A–C. The resistance between any pair of electrodes is a function of the specific resistivity of the electrolytic solution, the spacing between the electrodes and the opposed conducting surface area. With three electrode plates connected in this manner, it is readily apparent that the resistance among the several phases will not be equal creating an unbalanced condition in the system. The imbalance results from the dissimilarity of the electrically conductive paths. In this example, the conductive path between electrodes A and C will be at least double that of electrodes A and B and electrodes B and C creating a very serious and undesirable unbalanced resistance condition. This problem can be partially eliminated, as in prior art rheostats, by the simple expedient of adding another electrode at one side of the electrode assembly and electrically connecting this electrode to the electrode at the opposite side. The electrodes will thus be arranged in phase relationship as follows:

A–B–C–A′

Now the electrically conducting paths will be substantially equal from the standpoint of their actual physical position.

This does not mean, however, that the electrical conductance or resistance between any pair of electrodes will be equal to that between any other pair of electrodes. Each of the outer electrodes A–A′, has a surface which is not opposed to a surface of any other electrode and is also separated from at least one other electrode by a third electrode. Thus, electrode A is separated from electrode C by electrode B. Electrode A′ is similarly separated from electrode B. The conductive surface area will thereby be greater for the outer electrodes and produce a smaller resistance where all of the electrodes are uniformly spaced. As was previously indicated, the resistance (R) between any pair of conducting electrodes is a function of the length of the conductive path (d) (electrode spacing) and the conducting surface area (a) of the electrodes. This relationship is expressed by the formula:

$$R = \rho \frac{d}{a}$$

To obtain a balanced three-phase system with parallel plates, it is only necessary to maintain the ratio d/a constant in respect to any pair of electrodes. Therefore, the outer or end electrodes A and A′ are accordingly spaced further from the adjacent electrodes B and C, respectively, to counteract any increase in the conductive area of the electrodes A and A′. The increase in the spacing between electrodes A–B and A′–C may be expressed by the mathematical formula:

$$X = L\sqrt{1 - \frac{X}{L}}$$

where X is the spacing between the end electrodes and the adjacent electrodes and L is the spacing between the inner electrodes B and C. The solution to this formula shows that the X spacing will always be greater than the L spacing by some constant factor. In this particular example, the factor is found to be 1.62. Thus, positioning the outer electrodes A and A′ at this distance from the adjacent inner electrodes B and C, as shown in FIGS. 2 and 3, will provide a precisely balanced resistance system. This result may also be obtained by altering the area of the electrodes to account for the increased area through use of interconnected end electrodes A and A′.

Each bus bar 18, 19, or 20 is connected by a conductor 21, 22, or 23 to a respective phase terminal A, B, or C of the wound rotor of an induction motor 24. An induction motor of this type is also provided with a stator winding which is connected to a three-phase power supply.

In accordance with this invention, the resistance of the rheostat is varied by moving the insulator assembly 12 relative to the electrode assembly 11 to vary the effective current conducting surface area of the electrodes. The insulator assembly 12 includes six relatively spaced, flat plates 25 fabricated from an electrically insulating material. Each insulator plate 25 is substantially rectangular in shape and is disposed in a vertical plane between a pair of adjacent electrode plates 13. Since there are seven electrode plates 13, six insulator plates 25 are required which are relatively spaced to position one insulator plate between each pair of adjacent electrode plates 13. The insulator plates extend horizontally between the end walls 14 and 15 of the receptacle 10 having marginal ends 25a slidably disposed in vertically extending slots 26 formed in the inwardly facing surfaces of the end walls 14 and 15. The slots 26 are positioned intermediate the pairs of adjacent electrode plates 13 to center the insulator plates 25. Extending across the upper edges of the insulator plates are a plurality of transverse spacer blocks 27 which are rigidly secured to each of the insulator plates 25 thus forming a rigid insulator assembly 12 movable as a unit relative to the electrode assembly 11.

The insulator plates may be fabricated from any suitable non-conducting material which is substantially unaffected by the electrolytic solution. A material having a density not greater than that of the electrolytic solution is of particular advantage in large capacity rheostats to reduce the weight problem. A less dense material will provide a buoyant effect when the insulator plates are immersed, or at least partially immersed, in the electrolytic solution and thereby correspondingly reduce the energy required for elevating the insulator assembly. In any event, the usual insulating materials may be fabricated as flat plates which are lighter in weight than the metal electrodes utilized in prior art rheostats thereby reducing the energy required to effect a change in resistance.

The lower marginal edge of each insulator plate 25 is formed with a plurality of notches 28, as best shown in FIG. 1, to provide a non-linear resistance characteristic. Each plate 25 includes four similar, triangularly shaped notches 28 forming downwardly extending points 29. For each increment of movement of the insulator plates 25 relative to the electrode assembly 11, assuming that the notched marginal edge is interposed therebetween, the resistance will also be changed but non-linearly. By suitably shaping the notches 28, or otherwise irregularly forming the lower marginal edge of the insulator plates, an appropriate resistance-insulator movement characteristic may be created for a specific application. Although the notches 28 in each insulator plate 25 are shown as uniformly spaced relative to the other plates, the notches may be otherwise relatively positioned. For example, the notches 28 in adjacent plates may be formed at alternate locations to permit a more uniform current distribution throughout the electrodes 13. With the notches 28 alternately positioned, the current will not be concentrated in one area for the opposite sides of the electrode.

The insulator assembly 12 is movable between an upper elevated position with the lower marginal edge of the insulator plates 25 disposed above the electrode plates 13 and a lower immersed position where the vertex of each notch 28 is disposed a distance below the lower marginal edge 13a of the electrode plates. The upper and lower positions are indicated in FIGURE 1 by the broken line representation of the notched edge of the insulator plate. In its upper elevated position, the resistance between the electrode plates 13 will be at a minimum since the opposed surface area of the plates will be at a maximum. As the insulator assembly 12 is lowered to interpose the insulator plates 25 between their respective pairs of electrodes 13, the resistance between any pair of electrodes will be gradually increased as the insulator assembly approaches its lower position. Thus, the effective conducting area of each electrode plate will be reduced correspondingly. The control of the resistance will be precise over the entire range of movement of the insulator assembly 12. There is no sharp change between an infinite resistance and a finite measurable resistance. This results from maintaining the electrode plates 13 fully immersed in the electrolytic solution.

Other resistance-relative movement of electrode and insulator characteristics may be readily obtained by either altering the form of the notches, as previously indicated or by changing the location of the notches. As an example of the latter, the notches may be formed along the opposite edge of the insulator plate. In this instance, the resistance will change linearly as the insulator plates are interposed between the electrodes until the notched area is disposed between the electrodes. It is also to be noted that the resistance characteristic is dependent upon relative movement of the insulator and electrode plates and, consequently, if desired for optimum performance in a specific application, the electrode assembly may be movably supported within the electrolytic solution and the insulator assembly immovably supported.

The electrode assembly is provided with shorting clips to eliminate all resistance in the electrode assembly at any time the insulator assembly 12 is moved to its upper elevated position. The shorting clips, as best shown in FIGS. 4 and 5, include pairs of spring fingers 30 which are secured to the center electrode plates 13 to form an electrical connection between the several plates which effectively bypasses the electrolytic solution. In the illustrated embodiment for a three-phase system, a pair of spring fingers 30 are secured to the upper marginal edges of two adjacent pairs of electrode plates. Each pair of spring fingers 30 includes similarly shaped, although oppositely disposed, strips of metal having arcuately curved end portions. The spring fingers 30 are rigidly fastened to their respective electrode plates by riveting, for example, with the arcuate end portions extending above the electrode plates. The arcuately curved end portions of the fingers are maintained in contacting engagement by the resiliency of the material from which they are fabricated. Each pair of fingers 30 is disposed longitudinally along the electrode assembly to coincide with the path of a vertically moving point 29 of the notched edge of an insulator plate 25. Preferably, the edge of the point 29 is rounded to facilitate entry between the diverging ends of the fingers 30. As the insulator assembly 12 is lowered between the electrode assembly, the electrode plate 25 will separate the spring fingers 30 thereby permiting normal operation of the rheostat.

The insulator assembly 12 is supported by a manually operated mechanism for controlling the vertical position thereof relative to the electrode assembly 11. The control mechanism includes an elongated, screw threaded shaft 33 which is fixed to the upper portion of the insulator assembly 12 and extends a distance upwardly therefrom. The shaft 33 is slidably disposed in a hub 34 carried by a bracket member 35. The bracket member 35 extends across the top of the receptacle 10 and is rigidly secured thereto by several bolts 36. Rotatably mounted on the shaft 33 is a worm gear 37 having a hub provided with an internally formed screw thread for cooperatively engaging the threaded portion of the shaft 33. The worm gear 37 is carried on the upper face of the hub 34 for supporting the insulator assembly 12. Turning the worm gear 37 in the appropriate direction will accordingly raise or lower the insulator assembly 12. A hand operated crank shaft 38 journaled in a pair of bearings 39 mounted on the bracket 35 is provided to facilitate rotation of the worm gear 37. A worm 40 is fixed to one end of the shaft 38 in cooperative engagement with the worm gear 37. A hand crank 41 is fixed to the opposite end of the shaft 38.

If desired, a mechanically operated and automatically controlled mechanism may be substituted for the manually operated mechanism. It is a well known practice in automated pumping installations to provide a control which is automatically responsive to a specific fluid condition for controlling the speed of the pump motor.

A modified form of the liquid rheostat is illustrated in FIGS. 6 and 7. The insulator assembly 12a is mounted for vertical pivoting movement about a horizontal axis and includes a plurality of insulator plates 42 mounted at one end on a horizontally disposed shaft 43. Each insulator plate 42 is fixed on the shaft 43 to rotate therewith between a vertical, low resistance, position, indicated by the broken line representation in FIG. 7, and a horizontal, high-resistance, position. The shaft 43 may be driven by a manual control apparatus similar to that shown in FIGS. 1 and 2. In this instance, however, a worm gear 44 is fixed to the shaft 43 whereby rotation of a cooperatively engaged worm 45 pivots the insulator assembly. The worm 45 is fixed on a manually operated crankshaft 46. Variation in resistance between electrode plates is accomplished in a manner similar to that previously described. As the insulator assembly 12a is pivoted in a counterclockwise direction from a vertical position, each insulator plate will be interposed between adjacent pairs of electrode plates 47 supported in a receptacle 10a. If desired, the marginal edge of the insulator plates 42 may also be notched or otherwise irregularly formed to produce the desired resistance characteristic.

Although both embodiments of the rheostat illustrated and described hereinbefore are of a type which may be commonly termed the vertically movable type, a rheostat embodying the principles of this invention may be constructed in which the insulator and electrode assemblies are relatively movable in various other planes. For example, the insulator and electrode assemblies may be disposed in a horizontal plane with the relative movement accordingly occurring in a horizontal plane. In this respect, it is to be understood that regardless of the particular plane of relative movement, or whether the insulator or electrode assembly is movably supported, or both movably supported, it is only necessary for the electrode assembly to be fully immersed in the electrolytic solution. For a horizontal movement type rheostat, the insulator assembly would also be fully immersed in the electrolytic solution.

In operation of the rheostat, assuming that the three-phase terminals A, B, and C of the rotor of an induction motor 24 are connected to the bus bars 18, 19 and 20, vertical movement of the insulator assembly 12 will vary the resistance of the electrode assembly 11. With the insulator assembly 12 supported in its upper elevated position, the resistance of the electrode assembly will be at a minimum. In this position, the pairs of spring fingers 30 are in contacting engagement to short out the electrode plates for a zero resistance-maximum motor speed condition. Lowering the insulator assembly until the insulator plates 25 separate the spring fingers 30 will permit the resistance to increase as a function of the immersed surface area of the opposed electrode plates 13. Further lowering of the insulator assembly 12 to interpose the insulator plates 25 between the respective pairs of electrode plates 13 will reduce the opposed surface area of the adjacent pairs of electrode plates which is effective in conduction of an electric current. Thus, continued lowering of the electrode assembly will further increase the resistance until the pairs of electrode plates 13 are fully separated by an insulator plate for a maximum resistance approaching infinity. Reversing the direction of movement of the insulator assembly will decrease the resistance.

It is readily apparent that the liquid rheostat of this invention is not affected by corrosion as the electrodes remain immersed in the electrolytic solution resulting in longer life and less maintenance. The electrode plates remain in a fixed position simplifying their connection to an electrical system. The movable insulator assembly is an important safety feature substantially reducing the likelihood of receiving an electrical shock. Control of the resistance is greatly facilitated as there is no large abrupt change in resistance since the electrodes remain immersed in the electrolytic solution.

According to the provisions of the patent statutes, the principles of the invention have been explained and have been illustrated and described. However, it is to be understood that, within the scope of the appended claims, the invention may be practiced otherwise than as specifically illustrated and described.

Having thus described this invention, what is claimed is:

1. A liquid rheostat for a polyphase electrical system comprising a receptacle containing a quantity of liquid electrolyte; an electrode assembly including a plurality of spaced parallel electrode plates with the number of said electrode plates being one greater than a multiple of the number of phases of the electrical system with each of said electrode plates being supported fully immersed in said electrolyte in relatively staked relationship and having the same conductive area, said electrode plates being sequentially phase-connected with the end electrode plates connected to the same phase and with all of said electrode plates being spaced equidistantly relative adjacently disposed electrode plates excepting the end electrode plates, each of said end electrode plates being relatively spaced from the immediately adjacent electrode plate a distance greater than and related to the distance between any other adjacent pair of electrode plates whereby the resistance between any two phases of the electrical system will be substantially equal with the spacing being defined by the mathematical expression $$x = L\sqrt{1 - \frac{x}{L}}$$

in which $x$ is the distance between an end electrode plate and an adjacent electrode plate and $L$ is the distance between any other pair of adjacently disposed electrode plates; an insulator assembly having a plurality of spaced parallel insulator plates supported for movement relative to said electrode assembly for changing the effective conductive area of adjacent pairs of said electrode plates and thereby effecting a change in the resistance of said electrode assembly, said insulator assembly having one insulator plate for each adjacent pair of electrode plates with each of said insulator plates being selectively positionable between a respective pair of said electrode plates, and means mechanically connected between said electrode assembly and said insulator assembly for selectively effecting relative movement therebetween.

2. A liquid rheostat according to claim 1 wherein the spacing of each of said end electrode plates relative an immediately adjacent electrode plate is greater than the spacing between any other pair of adjacently disposed electrode plates by a factor of 1.62.

3. A liquid rheostat according to claim 1 which includes shorting means for electrically interconnecting all phases of the electrical system, said shorting means comprising a pair of resilient spring fingers connected between a pair of adjacently disposed electrode plates which are connected with opposite phases of the electrical system with there being a pair of spring fingers for each phase pair of the electrical system, said pairs of spring fingers being normally in contacting engagement and being relatively separated when the plates of said insulator assembly are interposed between said electrode plates.

4. A liquid rheostat according to claim 1 wherein a marginal edge portion of each of said insulator plates which is relatively movable into and out of overlapping relationship relative to said electrode plates is shaped so as to provide a gradual resistance change when the marginal edge portion of said insulator plates moves into or out of overlapping relationship relative to said electrode plates.

References Cited by the Examiner

UNITED STATES PATENTS

| | | | |
|---|---|---|---|
| 1,086,109 | 2/14 | Wilkinson | 338—82 X |
| 1,365,421 | 1/21 | MacKay | 338—80 X |
| 1,386,487 | 8/21 | Forssblad | 219—290 |
| 2,457,124 | 12/48 | Chadwick et al. | 338—82 |
| 2,734,458 | 2/56 | Hays | 338—86 X |
| 3,053,964 | 9/62 | Foley et al. | 338—81 X |

FOREIGN PATENTS

| | | |
|---|---|---|
| 101,381 | 6/37 | Australia. |
| 222,634 | 7/59 | Australia. |
| 493,759 | 10/38 | Great Britain. |

RICHARD M. WOOD, *Primary Examiner.*
ANTHONY BARTIS, *Examiner.*